US007320090B2

(12) United States Patent
Coulter, Jr. et al.

(10) Patent No.: US 7,320,090 B2
(45) Date of Patent: Jan. 15, 2008

(54) METHODS, SYSTEMS, AND MEDIA FOR GENERATING A REGRESSION SUITE DATABASE

(75) Inventors: James J. Coulter, Jr., Raleigh, NC (US); Amir Hekmatpour, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/864,119

(22) Filed: Jun. 9, 2004

(65) Prior Publication Data

US 2005/0283664 A1 Dec. 22, 2005

(51) Int. Cl.
*G06F 11/00* (2006.01)

(52) U.S. Cl. ................................ 714/30; 716/5; 716/6

(58) Field of Classification Search .................. 714/30; 716/5, 6

See application file for complete search history.

(56) References Cited

U.S. PATENT DOCUMENTS 5,673,387 A 9/1997 Chen et al.
5,694,540 A 12/1997 Humelsine et al.
5,778,169 A 7/1998 Reinhardt
6,061,643 A 5/2000 Walker et al.
6,269,457 B1 * 7/2001 Lane .......................... 714/38
6,298,317 B1 10/2001 Wiemann
6,351,826 B1 2/2002 Kato
6,385,607 B1 5/2002 Iyengar
6,415,396 B1 7/2002 Singh et al.
6,427,000 B1 7/2002 Mumford et al.
6,490,696 B1 12/2002 Wood et al.
6,546,547 B1 4/2003 Runyan et al.
6,606,735 B1 * 8/2003 Richardson et al. ........... 716/5
2003/0061581 A1 * 3/2003 Baumgartner et al. ......... 716/4

FOREIGN PATENT DOCUMENTS

EP 1187097 A2 3/2002

OTHER PUBLICATIONS

Barret, A.; Baumgartner, J.; Mandymam, S.; & Raghavan, R.; "IBM Technical Diclosure Bulletin", v40, n3, pp. 153-156 (Mar. 1997).

* cited by examiner

*Primary Examiner*—Bryce P Bonzo
(74) *Attorney, Agent, or Firm*—Joscelyn G. Cockburn; Schubert Osterrieder & Nickelson PLLC

(57) ABSTRACT

Methods, systems and media for generating an improved regression suite by applying harvesting models and/or regression algorithms to tests utilized in verification of a system are disclosed. In one embodiment, a regression manager responsive to user input may be coupled to a harvester module, an analysis module, and a management module. In one embodiment, the harvester module is responsive to harvesting models defined in a modeling language, where the harvester module is coupled to a regression suite database. In another embodiment, a regression methodology may be defined from a collection of regression strategies and each regression strategy may be defined from a combination of harvesting models and/or regression algorithms. A regression generator to receive tests, to apply one or more regression strategies to the tests, to provide reports, and to allow user control may also be provided.

5 Claims, 13 Drawing Sheets

600

602 ← 604 → 606

| TEST SIGNATURE | Att1 | Att2 | Att3 | Att4 | Att5 | Att6 | Att7 | Att8 | Att9 | Att10 | KEEPRS' LIST #1 |
|---|---|---|---|---|---|---|---|---|---|---|---|
| T1 (1, 6) | T1 | | | | | T1 | | | | | T1 |
| T2 (3, 7, 9) | T1 | | T2 | | | T1 | T2 | | T2 | | T1,T2 |
| T3 (3, 5, 10) | T1 | | T2 | | T3 | T1 | T2 | | T2 | T3 | T1,T2,T3 |
| T4 (1, 3, 5, 9) | T1 | | T2 | | T3 | T1 | T2 | | T2 | T3 | T1,T2,T3 |
| T5 (2, 8, 10) | T1 | T5 | T2 | | T3 | T1 | T2 | T5 | T2 | T3 | T1,T2,T3,T5 |
| T6 (4) | T1 | T5 | T2 | T6 | T3 | T1 | T2 | T5 | T2 | T3 | T1,T2,T3,T5,T6(100%) |
| ARRAY RESET | | | | | | | | | | | KEEPRS' LIST #2 |
| T7 (1, 2, 3, 4, 5, 6, 7) | T7 | T7 | T7 | T7 | T7 | T7 | T7 | | | | T7 |
| T8(1, 3, 5, 9, 10) | T7 | T7 | T7 | T7 | T7 | T7 | T7 | | T8 | T8 | T7,T8(90%) |

| TEST SIGNATURE | Att1 | Att2 | Att3 | Att4 | Att5 | Att6 | Att7 | Att8 | Att9 | Att10 | KEEPRS' LIST #1 |
|---|---|---|---|---|---|---|---|---|---|---|---|
| T1 (1, 6) | T1 | | | | | T1 | | | | | T1 |
| T2 (3, 7, 9) | T1 | | T2 | | | T1 | T2 | | T2 | | T1,T2 |
| T3 (3, 5, 10) | T1 | | T2 | | T3 | T1 | T2 | | T2 | T3 | T1,T2,T3 |
| T4 (1, 3, 5, 9) | T1 | | T2 | | T3 | T1 | T2 | | T2 | T3 | T1,T2,T3 |
| T5 (2, 8, 10) | T1 | T5 | T2 | | T3 | T1 | T2 | T5 | T2 | T3 | T1,T2,T3,T5 |
| T6 (4) | T1 | T5 | T2 | T6 | T3 | T1 | T2 | T5 | T2 | T3 | T1,T2,T3,T5,T6(100%) |
| ARRAY RESET | | | | | | | | | | | KEEPRS' LIST #2 |
| T7 (1, 2, 3, 4, 5, 6, 7) | T7 | T7 | T7 | T7 | T7 | T7 | T7 | | | | T7 |
| T8(1, 3, 5, 9, 10) | T7 | T7 | T7 | T7 | T7 | T7 | T7 | | T8 | T8 | T7,T8(90%) |

| TEST SIGNATURE | Att1 | Att2 | Att3 | Att4 | Att5 | Att6 | Att7 | Att8 | Att9 | Att10 | KEEPRS' LIST #1 |
|---|---|---|---|---|---|---|---|---|---|---|---|
| T1 (1, 6) | 1 | 0 | 0 | 0 | 0 | 1 | 0 | 0 | 0 | 0 | T1 |
| T2 (3, 7, 9) | 1 | 0 | 1 | 0 | 0 | 1 | 1 | 0 | 1 | 0 | T1,T2 |
| T3 (3, 5, 10) | 1 | 0 | 1 | 0 | 1 | 1 | 1 | 0 | 1 | 1 | T1,T2,T3 |
| T4 (1, 3, 5, 9) | 1 | 0 | 1 | 0 | 1 | 1 | 1 | 0 | 1 | 1 | T1,T2,T3 |
| T5 (2, 8, 10) | 1 | 1 | 1 | 0 | 1 | 1 | 1 | 1 | 1 | 1 | T1,T2,T3,T5 |
| T6 (4) | 1 | 1 | 1 | 1 | 1 | 1 | 1 | 1 | 1 | 1 | T1,T2,T3,T5,T6(100%) |
| ARRAY RESET | 0 | 0 | 0 | 0 | 0 | 0 | 0 | 0 | 0 | 0 | KEEPRS' LIST #2 |
| T7 (1, 2, 3, 4, 5, 6, 7) | 1 | 1 | 1 | 1 | 1 | 1 | 1 | 0 | 0 | 0 | T7 |
| T8(1, 3, 5, 9, 10) | 1 | 1 | 1 | 1 | 1 | 1 | 1 | 0 | 1 | 1 | T7,T8(90%) |

| TEST SIGNATURE | Att1 | Att2 | Att3 | Att4 | Att5 | Att6 | Att7 | Att8 | Att9 | Att10 | KEEPRS' LIST #1 |
|---|---|---|---|---|---|---|---|---|---|---|---|
| T7 (1, 2, 3, 4, 5, 6, 7) | T7 | T7 | T7 | T7 | T7 | T7 | T7 | | T8 | T8 | T7 |
| T8 (1, 3, 5, 9, 10) | T7 | T7 | T7 | T7 | T7 | T7 | T7 | | T8 | T8 | T7,T8 |
| T4 (1, 3, 5, 9) | T7 | T7 | T7 | T7 | T7 | T7 | T7 | | T8 | T8 | T7,T8 |
| T5 (2, 8, 10) | T7 | T7 | T7 | T7 | T7 | T7 | T7 | T5 | T8 | T8 | T7,T8,T5 |
| ARRAY RESET | | | | | | | | | | | KEEPRS' LIST #2 |
| T3 (3, 5, 10) | | | T3 | | T3 | | | | | T3 | T3 |
| T2 (3, 7, 9) | | | T3 | | T3 | | T2 | | T2 | T3 | T3,T2 |
| T1 (1, 6) | T1 | | T3 | | T3 | T1 | T2 | | T2 | T3 | T3,T2,T1 |
| T6 (4) | T1 | | T3 | T6 | T3 | T1 | T2 | | T2 | T3 | T3,T2,T1,T6 (80%) |

| TEST SIGNATURE | Att1 | Att2 | Att3 | Att4 | Att5 | Att6 | Att7 | Att8 | Att9 | Att10 | KEEPRS' LIST |
|---|---|---|---|---|---|---|---|---|---|---|---|
| T1 (1, 6) | T1 | | | | | T1 | | | | | T1 |
| T2 (3, 7, 9) | T1 | | T2 | | | T1 | T2 | | T2 | | T1,T2 |
| T3 (3, 5, 10) | T1 | | T2 | | T3 | T1 | T2 | | T2 | T3 | T1,T2,T3 |
| T4 (1, 3, 5, 9) | T1 | | T2 | | T3 | T1 | T2 | | T2 | T3 | T1,T2,T3 |
| T5 (2, 8, 10) | T1 | T5 | T2 | | T3 | T1 | T2 | T5 | T2 | T3 | T1,T2,T3,T5 |
| T6 (4) | T1 | T5 | T2 | T6 | T3 | T1 | T2 | T5 | T2 | T3 | T1,T2,T3,T5,T6 |
| T7 (1, 2, 3, 4, 5, 6, 7) | T7 | T5 | T2 | T7 | T3 | T7 | T2 | T5 | T2 | T3 | T2,T3,T5, T7 |
| T8(1, 3, 5, 9, 10) | T7 | T5 | T2 | T7 | T8 | T7 | T2 | T5 | T2 | T8 | T2,T5, T7,T8 (100%) |

| TEST SIGNATURE | Att1 | Att2 | Att3 | Att4 | Att5 | Att6 | Att7 | Att8 | Att9 | Att10 | KEEPRS' LIST |
|---|---|---|---|---|---|---|---|---|---|---|---|
| T7 (1, 2, 3, 4, 5, 6, 7) | T7 | T7 | T7 | T7 | T7 | T7 | T7 | | | | T7, |
| T8 (1, 3, 5, 9, 10) | T7 | T7 | T7 | T7 | T7 | T7 | T7 | | T8 | T8 | T7, T8, |
| T4 (1, 3, 5, 9) | T7 | T7 | T7 | T7 | T7 | T7 | T7 | | T8 | T8 | T7, T8, |
| T5 (2, 8, 10) | T7 | T7 | T7 | T7 | T7 | T7 | T7 | T5 | T8 | T8 | T7, T8, T5 (Stop |
| T3 (3, 5, 10) | | | | | | | | | | | PROCESSING 100% |
| T2 (3, 7, 9) | | | | | | | | | | | COVERAGE) |
| T1 (1, 6) | | | | | | | | | | | |
| T6 (4) | | | | | | | | | | | |

| TEST SIGNATURE | Att1 | Att2 | Att3 | Att4 | Att5 | Att6 | Att7 | Att8 | Att9 | Att10 | KEEPRS' LIST #1 |
|---|---|---|---|---|---|---|---|---|---|---|---|
| T7 (1, 2, 3, 4, 5, 6, 7) | 1 | 1 | 1 | 1 | 1 | 1 | 1 | 0 | 0 | 0 | T7 |
| T8 (1, 3, 5, 9, 10) | 2 | 1 | 2 | 1 | 2 | 1 | 1 | 0 | 1 | 1 | T7,T8 |
| T4 (1, 3, 5, 9) | 3 | 1 | 3 | 1 | 3 | 1 | 1 | 0 | 2 | 1 | T7,T8 |
| T5 (2, 8, 10) | 3 | 2 | 3 | 1 | 3 | 1 | 1 | 1 | 2 | 2 | T7,T8,T5 |
| T3 (3, 5, 10) | 3 | 2 | 4 | 1 | 4 | 1 | 1 | 1 | 2 | 3 | |
| T2 (3, 7, 9) | 3 | 2 | 5 | 1 | 4 | 1 | 2 | 1 | 3 | 3 | |
| T1 (1, 6) | 4 | 2 | 5 | 1 | 4 | 2 | 2 | 1 | 3 | 3 | |
| T6 (4) | 4 | 2 | 5 | 2 | 4 | 2 | 2 | 1 | 3 | 3 | |

| TEST SIGNATURE | Att1 | Att2 | Att3 | Att4 | Att5 | Att6 | Att7 | Att8 | Att9 | Att10 | KEEPRS' LIST |
|---|---|---|---|---|---|---|---|---|---|---|---|
| T1 (1, 6) | T1, | | | | | T1 | | | | | T1 |
| T2 (3, 7, 9) | T1, | | T2 | | | T1 | T2 | | T2, | | T1,T2 |
| T3 (3, 5, 10) | T1, | | T2,T3 | | T3 | T1 | T2 | | T2, | T3 | T1,T2,T3 |
| T4 (1, 3, 5, 9) | T4, T1, | | T4,T2,T3 | | T4, T3 | T1 | T2 | | T4, | T3 | T1,T2,T3 |
| T5 (2, 8, 10) | T4, T1, | T5 | T4,T2,T3 | | T4, T3 | T1 | T2 | T5 | T4,T2 | T3,T5 | T4,T1,T2,T3 |
| T6 (4) | T4, T1, | T5 | T4,T2,T3 | T6 | T4, T3 | T1 | T2 | T5 | T4,T2 | T3,T5 | T4,T5,T6, |
| T7 (1, 2, 3, 4, 5, 6, 7) | T7, T4, T1, | T7,T5 | T7,T4,T2,T3 | T7,T6 | T7, T4, T3 | T7, T1 | T7,T2 | T5 | T4,T2 | T3,T5 | T7,T5,T4,T3,T1,T2,T3 |
| T8 (1, 3, 5, 9, 10) | T7,T8, T4, T1 | T7,T5 | T7, T8,T4,T2,T3 | T7,T6 | T7, T8, T4, T3 | T7, T1 | T7,T2 | T5 | T8,T4,T2 | T8,T3,T5 | T7,T5,T8 |

| TEST SIGNATURE | Att1 | Att2 | Att3 | Att4 | Att5 | Att6 | Att7 | Att8 | Att9 | Att10 | KEEPRS' LIST |
|---|---|---|---|---|---|---|---|---|---|---|---|
| T7 (1, 2, 3, 4, 5, 6, 7) | T7 | T7 | T7 | T7 | T7 | T7 | T7 | | | | T7, |
| T8 (1, 3, 5, 9, 10) | T7,T8, | T7 | T7,T8, | T7 | T7,T8, | T7 | T7 | | T8 | T8 | T7, T8, |
| T4 (1, 3, 5, 9) | T7,T8, T4, | T7 | T7,T8, T4, | T7 | T7,T8, T4, | T7 | T7 | | T8, T4, | T8 | T7, T8, |
| T3 (3, 5, 10) | T7,T8, T4, | T7 | T7,T8, T4, T3 | T7 | T7,T8, T4, T3 | T7 | T7 | | T8, T4, | T8 T3 | T7, T8, |
| T2 (3, 7, 9) | T7,T8, T4, | T7 | T7,T8, T4, T3,T2 | T7 | T7,T8, T4, T3, | T7 | T7,T2 | | T8, T4, T2, | T8 T3, | T7, T8, |
| T5 (2, 8, 10) | T7,T8, T4, | T7,T5 | T7,T8, T4, T3,T2 | T7 | T7,T8, T4, T3, | T7 | T7,T2 | T5 | T8, T4, T2, | T8 T3,T5 | T7, T8, T5 |
| T1 (1, 6) | | | | | | | | | | | |
| T6 (4) | | | | | | | | | | | |

METHODS, SYSTEMS, AND MEDIA FOR GENERATING A REGRESSION SUITE DATABASE

BACKGROUND OF THE INVENTION

1. Field of the Invention

The present invention generally relates to the field of regression testing of complex systems. More particularly, the present invention relates to methods, systems, and media for generating an improved regression suite database for regression testing of computer systems, or components thereof.

2. Description of the Related Art

Verification of a complex integrated circuit system is an iterative process where the entire system (or at least all its major features) has to be tested on a continuous basis for the duration of the design. To alleviate the burden and to manage the increasing task of verification, regression testing is often adopted. Regression testing involves the repetitive testing of a design's major features to ensure changes and upgrades to the design have not introduced new bugs into the system. Regression test suites are necessary to ensure that changes to the system made as a result of previous tests (bugs found) or design upgrades/changes/enhancements have not "broken" something previously verified, or introduce a new bug somewhere else in the design. Examples of complex systems for which regression testing is used in the design include both hardware and software computer systems, such as integrated circuit (IC) chips.

Design of an IC chip, including its architecture, is a very complex, expensive, and time-consuming task, making verification of that design before fabrication critical. Verification of the design of a complex system such as an IC chip is an iterative process where the entire system (or at least all of its major features) is tested on a continuous basis for the duration of the design. As the design complexity increases, so does the state space and the number of functional states and finite state machines that need to be verified. In a typical microprocessor design environment, billions of simulation cycles are required to verify all features of the design.

The design process for an IC chip starts with the creation of a functional specification for the design. Once the functional specification has been completed, the verification team typically creates a test plan that specifies the functionality requiring testing at both the block and system levels. The team then creates testbenches (also known as tests) such as deterministic manually-written tests and automatically-generated tests to verify design functionality until the test plan requirements have been met. The process of verifying the functional specification of a design is called functional verification, which encompasses the development and implementation of a test plan.

Functional verification ensures functional conformance of a processor design to its architectural and microarchitectural specifications and determines whether the design is logically correct. The verification process involves developing and simulating tests that are used to determine whether design components (e.g., processor units, resources, functions, etc.) behave according to their functional specification, from both an architectural and microarchitectural perspective. Functional verification is desirably completed before fabrication of the processor, as finding and fixing errors, or bugs, after fabrication proves to be time-consuming and expensive.

When designing increasingly complex integrated circuits such as microprocessors, Application-Specific ICs (ASICs) and system-on-chips (SoC's), functional verification has proven to be a major bottleneck in achieving time-to-market goals. Design teams report that functional verification of medium- to large-complexity processors and ASICs may consume over 70% of the design team's manpower, schedule and budget. In spite of the time and resources consumed by functional verification, is an incomplete process, as design bugs are often not discovered until after fabrication.

Any situation with frequent application changes carries the risk of inadvertent problems being introduced, or regressed, into the application. To mitigate these risks, most organizations institute rigorous regression testing efforts. These initiatives however can become highly labor intensive and very expensive. Automatic Random Test Generation and simulation is sometimes used instead of test suite generation, maintenance and simulation. Such test generation environments run full-time and tests are simulated across a distributed simulation farm, resulting in a very large number of tests. Identifying the unique tests with the highest coverage is the goal of generating an optimized regression suite database.

Regression testing is a time-consuming and resource-intensive process used to validate a system's functionality following modifications. The cost-effectiveness of regression testing techniques varies with the characteristics of the test suites. One such characteristic, test suite granularity, involves the way in which test inputs are grouped into test cases within a test suite. Various cost-benefit tradeoffs have been attributed to choices of test suite granularity, but almost no research has formally examined these tradeoffs. It is not clear how this and similar regression testing techniques apply to a design with a very large number of inputs and state space.

Managing the ever increasing size of the regression suite database and the large simulation and verification resources required is a difficult problem. It is estimated that over 70% of the resources and development-cycle of a processor is used in its verification, with regression testing playing an important role. Due to increasing market pressure on the design turn around cycle, the functional specification, architectural definition and design and verification are conducted in parallel, or at least with large overlaps. Accordingly, regression generation and management in the field of processor verification is one of the most demanding and time/cost sensitive applications of the regression test suite concept.

Therefore, there is a need for methods, systems, and media to develop a minimal, high-coverage regression suite database that provides high verification coverage and reduces use of simulation time and resources.

SUMMARY OF THE INVENTION

Embodiments of the invention generally provide systems, methods and media for generating a regression suite database. One embodiment presents systems, methods and media for generating an optimized regression suite database based on a set of desired design and verification attributes and characteristics. A modeling language for defining the desired harvesting characteristics may be used, as well as a choice of one or more regression algorithms or regression strategies for generating and optimizing the regression suite database.

In one embodiment, a regression suite database generation system is disclosed. The system generally includes a regression manager responsive to user input and a regression suite database coupled to the regression manager, where the regression suite database may be used to store tests. The system also includes a regression generator to receive tests and to apply one or more regression strategies to the tests. Another embodiment also includes a harvester module for applying harvesting models to the tests, which are utilized for functional verification of designs.

A further embodiment provides a method for generating a regression suite database. The method may include receiving a plurality of tests and applying harvesting models to the plurality of tests to selectively choose one or more tests. The method may further include applying one or more regression strategies to the harvested tests to selectively choose one or more selected tests, and archiving the selected tests, such as in a regression suite database.

Another embodiment includes a computer readable medium for generating a regression suite database. The computer readable medium generally includes instructions which, when executed, performs operations including receiving a plurality of tests; applying harvesting models to the plurality of tests to selectively choose a plurality of harvested tests; applying a regression strategy to the harvested tests to selectively choose one or more selected tests; and saving the selected tests.

Some embodiments provide methods for performing regression. Those methods typically include receiving a test signature, the test signature including an indication of design and verification attributes satisfied by the test; initializing an array; after parsing the test signature, mapping an indication of the test name to null cells in the array associated with the attributes satisfied by the test; determining whether a new attribute was hit by the test; and adding the test to a keepers' suite if a new attribute was hit by the test.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 depicts a table showing the internal processing of a first hit single pass greedy algorithm regression algorithm in one embodiment.

FIG. 7 depicts a table showing an alternative embodiment of the internal processing of the first hit single pass greedy algorithm of FIG. 6.

FIG. 8 depicts a table showing the internal processing of a sorted first hit single pass greedy algorithm regression algorithm in one embodiment.

FIG. 10 depicts a table showing the internal processing of a best hit backward elimination regression algorithm in one embodiment.

FIG. 11 depicts a table showing the internal processing of a sorted best hit backward elimination regression algorithm in one embodiment.

FIG. 12 depicts a table showing an alternative representation of the internal processing of the best hit backward elimination regression algorithm in the embodiment of FIG. 11.

FIG. 14 depicts a table showing the internal processing of a normalized weighted hit algorithm regression algorithm in one embodiment.

FIG. 15 depicts a table showing the internal processing of a sorted normalized weighted hit algorithm regression algorithm in another embodiment.

DETAILED DESCRIPTION OF THE PREFERRED EMBODIMENTS

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments of the invention generally provide systems, methods and media for generating a regression suite database. One embodiment presents systems, methods and media for generating an optimized regression suite database based on a set of desired attributes and characteristics. A modeling language for defining the desired harvesting characteristics may be used, as well as choice of one or more regression algorithms or regression strategies for optimizing the generated regression suite database.

In one embodiment, a regression suite database generation system is disclosed. The system generally includes a regression manager responsive to user input and a regression suite database coupled to the regression manager, where the regression suite database may be used to store tests. The system also includes a regression generator to receive tests and to apply one or more regression strategies to the tests. A further embodiment also includes a harvester module for applying harvesting models to the tests. Another embodiment may define a regression strategy from a combination of harvesting models and regression algorithms.

A further embodiment provides a method for generating a regression suite database. The method may include receiving a plurality of tests and applying harvesting models to the plurality of tests to selectively choose one or more tests. The method may further include applying one or more regression strategies to the harvested tests to selectively choose one or more selected tests, and archiving the selected tests, such as in a regression suite database.

Figure 1:
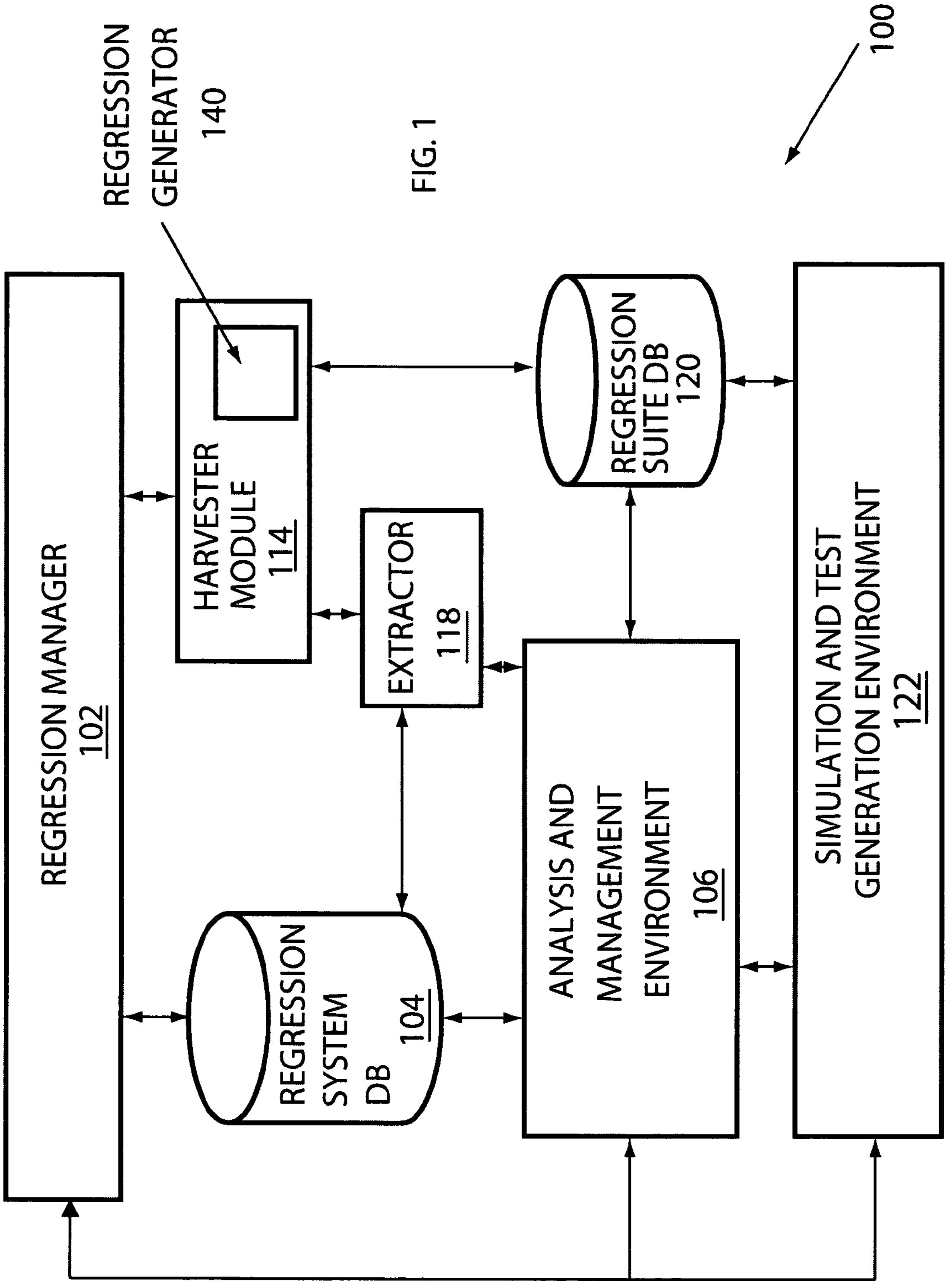
FIG. 1 depicts aspects of a functional verification regression management system, including a regression generator according to one embodiment.

Turning now to the drawings, FIG. 1 depicts aspects of a functional verification regression management system, including a regression generator, in one embodiment. In the depicted embodiment, functional verification regression management system 100 includes a regression manager 102, a regression system database 104, an analysis and management environment 106, a regression suite database 120, a harvester module 114, a regression generator 140, and an extractor module 118. The analysis and management environment 106 and the regression suite database 120 may be in communication with or coupled to a simulation and test generation environment 122, which may be separate from system 100.

Each software program described herein, such as those described in relation to FIG. 1, may be operated on any type of computer, such as a personal computer, server, mainframe, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. A computer program may typically be comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment. However, it should be appreciated that any particular program nomenclature that follows is used merely for convenience, and thus the invention should not be limited to use solely in any specific application identified and/or implied by such nomenclature.

Regression manager 102 may provide an interface to other components of the functional verification regression management system 100 for users, such as engineers, designers, administrators, etc. Using the regression manager 102, the processes of functional verification and regression testing may be managed or monitored, preferences may be set, reports may be generated, and administrative tasks performed. Regression manager 102 may, in one embodiment, be in a networked environment so that it is accessible by a plurality of users on workstations. Regression manager 102 may also be a Web-based application so that it may easily be accessed by users on different types of wired or wireless workstations. The regression manager 102 may also be used to manage multiple regression strategies, such as by starting and stopping each, assigning priorities or resources to them, etc. The operation and function of regression manager 102 is described in more detail in relation to FIG. 2.

The regression manager 102 may be in communication with the regression system database 104. The regression system database 104 may serve as a centralized database for any data associated with the regression suite database generation and optimization. Regression system database 104 may be stored on one or more storage devices and/or database management systems (which may be geographically distributed), such as servers, hard drives, permanent or temporary storage devices, etc., and may utilize any appropriate database technology, such as mySQL, DB2, etc. The regression system database 104 may contain any type of data relevant to management, control, an operation of the regression system processes, such as regression rules, harvesting models, regression strategies, project management configurations, regression summaries and lists, etc.

A centralized regression system database 104 may provide a number of advantages. One advantage of a centralized database is the information may be accessed by multiple components of system 100, reducing the total storage required. Any component of system 100 with storage or information needs may optionally access and/or save information using the regression system database 104. Processing time may also be saved, as regression rules and harvesting models, in one example, may be easily accessed by multiple components of system 100, reducing the need to replicate models and strategies. Such a centralized regression system database 104 may also improve model and strategy revision control and complex project administration tasks.

The analysis and management environment 106 may be in communication with the regression system database 104. The analysis and management environment 106 may serve to provide an interface between system 100 (including the regression system database 104) and the simulation and test generation environment 122. The analysis and management environment accomplishes this by receiving information from the simulation and test generation environment 122 (which may be from simulators, test generation farms, deterministic test benches, random generators, etc.), converting or translating the information if necessary, and passing the information along to the regression system database 104 or other parts of the system 100, such as the extractor module 118 and regression suite database 120.

The analysis and management environment 106 may also monitor and analyze the functional coverage of the verification tasks being performed. The functional coverage may include both architectural coverage analysis and microarchitectural coverage analysis. The analysis and management environment 106 may allow for integration of a wide variety of tools and simulations by facilitating a "plug-and-play" architecture for tools and simulations. This may be accomplished using the analysis and management environment 106 to receive simulation test results from the simulation and test generation environment 122 and to convert the simulation test results into a format recognized by the functional verification regression management system 100. This embodiment allows flexibility in the simulation tests performed, as the analysis and management environment 106 may handle conversion into the appropriate format. In this embodiment, if a new simulation or test is added, only a conversion from its format to one of the analysis and management environment 106 formats is needed for that simulation or test to be integrated into the functional verification regression management system 100. This simplifies the integration process and eliminates the need to change other components of system 100 to accommodate new tests or new verification tools. The conversion could be done by the analysis and management environment 106, by the simulation and test generation environment 122, or by another converter, or any combination. The ability to handle a wide variety of simulations and tests allows users of the functional verification system 100 to choose the best tool for the job, whether it be internal or external, wherever it is located, whatever format it might have, etc. This may also reduce necessary training, as users need not necessarily be trained on each type of simulation and test, instead only needed to be trained in using the regression management system 100.

In operation, the analysis and management environment 106 may monitor tests being run in the simulation and test generation environment 122 to see if any test result impacts its environment. If a test is relevant to the current regression, it can capture the test, its coverage information and simulation trace and logs so that it may pass it to the extractor module 118, regression suite database 120, or the regression system database 104. The analysis and management environment 106 may also keep a log of tests, recording everything it observes or processes, to help protect from loss of information if tests are lost. It also may provide management of and access to location and remote computers for the purpose of performing an analysis or management task or accessing the necessary verification information or tests.

The regression suite database 120 may be used to store a set of tests that, in the event of a change in the system design, should be run again to ensure functional verification. Control of the regression suite database 120 may be performed internally, by the harvester module 114, the coverage analysis module 106, or a combination thereof. In one embodiment, control is primarily controlled by a regression generator 140, which may be located in the harvester module 114, regression suite database 120, etc., or may be a standalone application.

The simulation and test generation environment 122 may include any simulators or tests that are used in the functional verification process. The simulators and/or tests may be distributed over multiple servers or computers (which may also be geographically distributed). Simulations (including tests or the results of simulators) may test for failures (also known as bugs or faults) in the design, which are situations where the logic expressed in the design language (eg. VHDL, Verilog) does not perform correctly under specific situations. Sometimes the failure cases are as simple as typographical errors and are found immediately. Other times, the failures require many different logic structures to align with very specific values causing a “window condition”. Ensuring that all relevant and approximate scenarios for a “window condition” are exercised may require a large number of tests exercising all classes of scenarios functionally possible in the target “window” under all permissible “condition” combinations. In most cases, managing such a large problem space requires significant computing power.

Testbenches are stimulus/response systems commonly described in Verilog, VHDL, C/C++ or proprietary HVL (Hardware Verification Languages) while the design is described in Verilog or VHDL at the RTL or gate level. The testbenches are developed to stimulate and verify the responses of the design. Depending on how the testbenches are structured, they can implement black box, white box directed, constrained random testing, or other testing methodologies. The simulation and test generation environment 122 may include any combination of these types of testing, as well as any other manual or automatic test generation, simulation, or other verification methods such as assertion-based verification, semi-formal and/or formal verification.

The harvester module 114 may be used to manage, customize, and update the regression suite database 120 and regression testing generally. The harvester module 114 may include a modeling language for selecting or ranking regression tests. The harvester module 114 may communicate directly with the regression system database 104, the regression suite database 120, or the extractor module 118. The harvester module 114 may, in a further embodiment, include a harvesting language for applying harvesting models to a set of tests. The harvesting models, in one embodiment, are applied before regression optimization begins. The harvester module 114 may include the regression generator 140. The functions and tasks performed by the harvester module 114 and the regression generator 140 may be performed by either or both.

In one embodiment, the regression generator 140 receives and analyzes a new test result from the simulator environment 122 or the harvester module 114, determines if any new states are hit (e.g., whether any new coverage data was generated), and saves the test result if the testing provided new and unique results. In another embodiment, the regression generator 140 further optimizes the test suite by eliminating earlier tests if they are supplanted by more recent ones. This functionality serves to reduce the size of the regression suite database 120 and to speed up retesting when changes to the design are made necessitating regression testing.

The regression generator 140 may generate a regression suite database 120 from among all tests simulated in verification of a design in order to maximize the overall density of effectiveness of the test suite with smallest number of tests as possible. The density of a regression suite database 120 may be measured as the total number of interesting and necessary design attributes that are verified when the regression is simulated. This is a measure of regression coverage—how many of the desired design attributes are exercised with a regression strategy. A regression strategy may be defined as applying one or more harvesting models and/or one or more regression algorithms to one or more classes of tests based on a predefined schedule, frequency, and verification environment conditions and attributes. A regression strategy may include a script of harvesting models and/or regression algorithms with instructions on when and how to apply them to a set of test to generate an optimized set of tests.

In addition to the coverage density of a regression strategy, the total resources utilized in generating, optimizing, storing and re-simulating the regression may also be taken into consideration by the regression generator 140. The regression strategy with the highest coverage and lowest cost is desired in order to quickly and inexpensively verify a design after each major upgrade/redesign or design check point.

Using the harvester module 114 or the regression generator 140, many aspects of the regression testing may be configured. For example, the size of regression suite database, the number of tests, the location of tests, the frequency or location of archiving, test signature duplication threshold, the uniqueness of the tests, etc., may all be configured. Configuration may occur using the regression manager 102 to control the harvester module 114 or regression generator 140 settings.

The extractor module 118 is used to extract information from simulation logs, simulation dumps or coverage analysis reports to determine what kind of design attribute was hit or exercised by the test. User-defined criteria for the extractor module 118 (which may be received from the regression manager 102) may be utilized to provide more precise control over the extraction. Extractor module 118 may search for messages generated by user defined monitors, checkers, or assertions.

All of the components of system 100 may run on servers or other computers. In one embodiment, each module could have its own server, all modules could run on a single server, or some other combination may be used. If a distributed processing model is used, a load leveler may optionally be used to help distribute the processing tasks across a number of computers or the network. An administrator may optionally use the regression manager 102, for example, to help distribute the process to specific servers. The potential for distributed operation and processing provides additional flexibility for optimization and fault-tolerance. The regression modeling, harvesting, design and verification attribute extraction, coverage analysis, simulation log and trace analysis and regression suite database optimization tasks can be performed on a local stand-alone server, a number of servers on a local network, or any combination of local and remote networked services. All of these tasks may be managed and controlled using the regression manager 102.

Any of the management modules of the functional verification regression management system 100, or any of their functions, may be combined in any way, such as by combining two modules into one or by taking functions from one module to another. For example, the harvester module 114 and the extractor module 118 may be combined into one module that performs the roles of both. Data may be transmitted between modules of the functional verification regression management system 100 via any form or method, including packets, network packets, etc. In one embodiment, system 100 includes mechanisms for consistency checking and data integrity in order to preserve the accuracy of the data. In a further embodiment, data transmitted within system 100 includes an indication of source and temporal attributes or other identifying information. It is desirable, for example, in the functional verification of complex systems such as IC chips to be able to identify the originating source of a test or set of tests that made a unique contribution to the coverage space (e.g., a new verified design state space). Other information may also be associated with test data, such as a cross-reference of its contribution to the active regression models or advisory reports or warnings.

System 100 and its associated algorithms, control and management utilities are designed for continuous operation in a full-time environment where new tests are continuously generated and simulated. Once suitable algorithms are selected and an appropriate regression strategy is devised, the system 100 may continuously collect and analyze the incoming tests based on the harvesting models and regression strategy and would optimize the resulting regression suite database based on the selected regression optimization algorithm(s).

Figure 2:
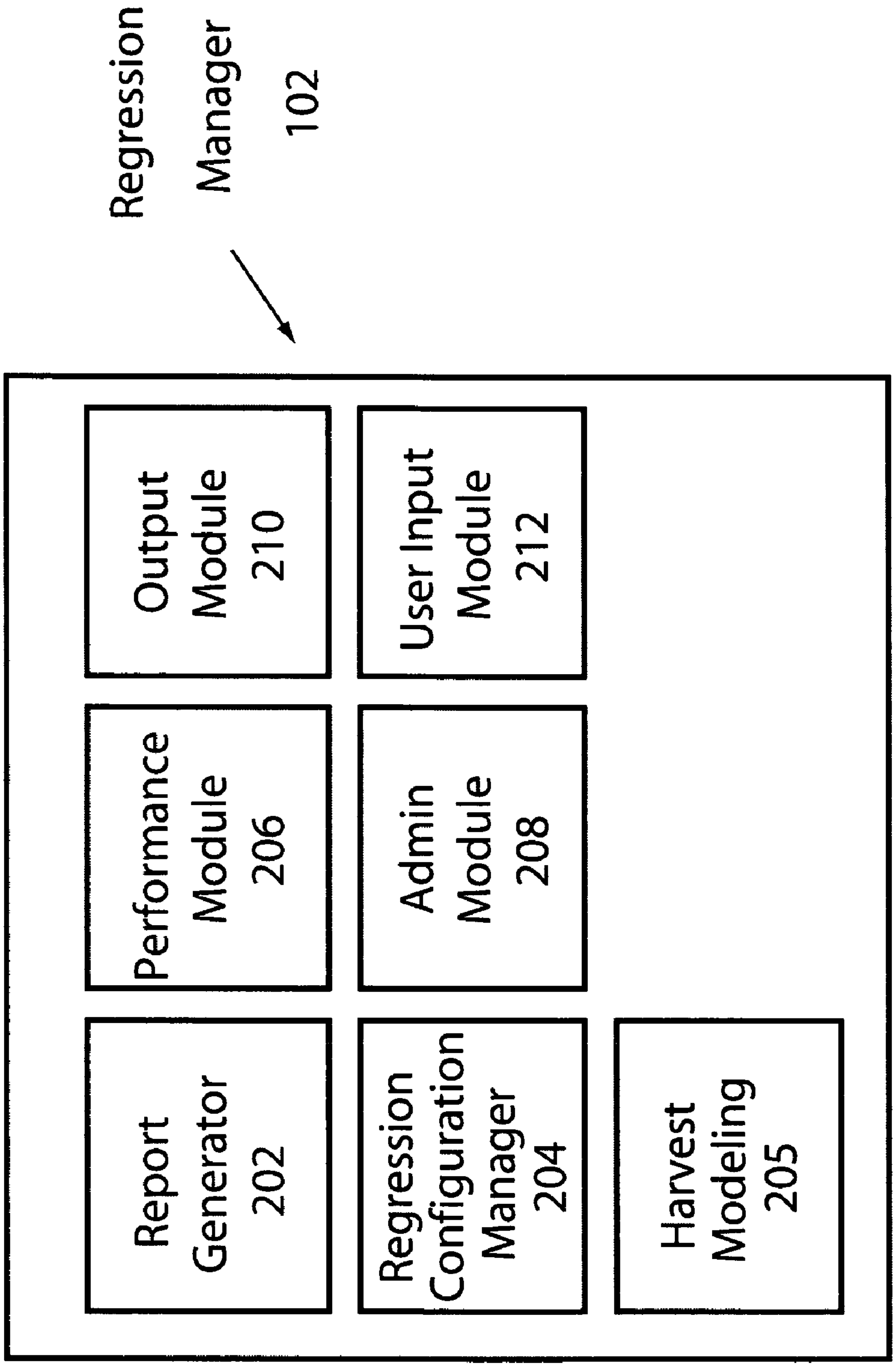
FIG. 2 depicts one embodiment of the regression manager, including a regression manager, of the functional verification regression management system of FIG. 1.

Referring now to FIG. 2, there is shown one embodiment of the regression manager 102, including a regression manager, of the functional verification regression management system 100 described in relation to FIG. 1. In the embodiment of FIG. 2, regression manager 102 includes a report generator 202, a regression configuration manager 204, a performance module 206, and an administration module 208. The regression manager 102 may also contain an output module 210 and a user input module 212. Storage of user preferences, etc., may be local at the regression manager 102 or at a different location, such as the regression system database 104.

The regression manager 102 assists a project manager in defining an overall regression strategy (which may be composed of a plurality of smaller regression strategies), taking into consideration the number of tests, the size of tests, network capacity, file system attributes, the project schedule or deadlines, project model release frequency, regression testing frequency, etc.

The report generator 202 may be used to create reports for users of the regression manager 102. In one embodiment, the report generator 202 may be used to generate regression status and progress reports of varying depth and complexity. The report functionality of the report generator 202 may be, in this embodiment, available to all users of the functional verification regression management system 100. The reports generated by the report generator 202 may be customized in any way, such as by format, source of data, timeframes, type of report, etc. In one embodiment, regression suite database generation reports may be generated. Regression suite database generation reports may provide information on the number of tests reviewed, the number of tests eliminated via regression methodologies, the methodologies chosen, the number of times regression methodologies were applied, the richness of remaining tests, size and coverage density of a regression suite database, etc. Incremental progress reports may also be generated.

Charts, tables, reports, etc. created by report generator 202 may be in any format and via any media, such as print-outs, viewed on a computer screen, audibly communicated, via e-mail, etc. Any type of report may be generated by the report generator 202. Reports may be automatically generated, generated upon the occurrence of a particular event (regression size limits condition, test signature triggers, etc.), generated upon user request, etc. The format, content, frequency, comprehensiveness, etc. of reports may be modified by a user in one embodiment. Users may also subscribe to standard reports or reports generated by other users.

The regression configuration manager 204 may be used to control or customize various settings in the regression suite database 120 and/or the regression generator 140. Access to the functionality of the regression configuration manager 204 may, in one embodiment, be restricted to certain types of users, such as coverage engineers and administrators, as changes by users unfamiliar with the methodology or the regression environment could cause loss of valuable tests or result in an inefficient regression suite.

In one embodiment, the regression configuration manager 204 may be used to configure the regression methodology and its associated strategies being applied to a verification. Many aspects of the regression may be controlled, such as how many tests are saved, the rigorousness of the regression modeling, the strictness of the regression testing (i.e., how rigorous it must be), the frequency of regression testing, the number and types of regression strategies, event triggers to start regression testing (such as size of change, period of time, etc.), etc. Commands to the regression suite database 120 may be received and processed by the regression configuration manager 204, such as when a user wants to start or stop regression testing, wants to delete a particular test, apply a particular harvesting model or regression strategy or algorithm, etc. The progress of regression strategies may also be monitored by users using the regression configuration manager 204.

Harvesting modeling manager 205 may be used to modify harvesting models, such as by defining conditions as to whether a test should be sent to regression or bypassed. In this embodiment, the standards for sending a test to the regression suite database 120 can be raised or lowered depending on the particular testing needs. Harvesting models defined in a modeling language may serve as a global filter and pruning mechanism for all tests received and processed by system 100. Any modeling language may be used to provide a mechanism for a user to define aspects or parameters of the harvesting model.

The performance module 206 may be used to monitor and/or control performance or configuration aspects of the functional verification regression management system 100. The performance module 206 may provide real-time displays, reports (such as based on a particular timeframe), warnings or alerts, etc., and may also be used to redirect computer resources (such as processing power, disk space, etc.) when needed or desired. The performance module 206 may accept direction via direct user input, via batch files, via calculated or determined parameters, etc. In one embodiment, disk space is controlled, such as by defining disk partitions for particular tests, models, etc. Different disk partitions may be set up for different simulation strategies so that each can be easily managed independently. Disk space may also be monitored so that data could be reconfigured when, say, a disk becomes almost full so as to prevent decreases in performance. The performance module 206 may also monitor and/or control throughput on the network so that bottlenecks or chokepoints can be identified and reported.

The performance module 206, in one embodiment, may also monitor and/or control databases and servers. If a database has become full, the performance module 206 could report that state, and a new database may be brought on-line to help via user command or automatically. Server usage and capacity may also be monitored and/or controlled. If one server went down, in one example, a new server could be brought on-line or the processing sent to the failed server could be redirected. This function may be particularly useful when multiple regression strategies are being attempted and resources need to be efficiently distributed.

The administration module 208 may be used to access administrative data and to perform administrative tasks. Permissions to different aspects of the functional verification regression management system 100 may be restricted to those users with the appropriate needs and training. In one embodiment, access to the administration module 208 would be limited to personnel with the appropriate training and authority. In this embodiment, a user with administrator access may add/delete, change users, passwords, file system, projects, etc. In an alternative embodiment, other users besides those with administrative access could add a new project to the system 100.

The output module 210 includes means to convey information to a user, such as a computer monitor, monitor, audible device, communication device such as e-mail, etc. The user input module 212 may be used to receive and/or process user input, such as input received by keyboard entries, verbal commands, e-mail communications, web-based forms and menus, etc.

Figure 3:
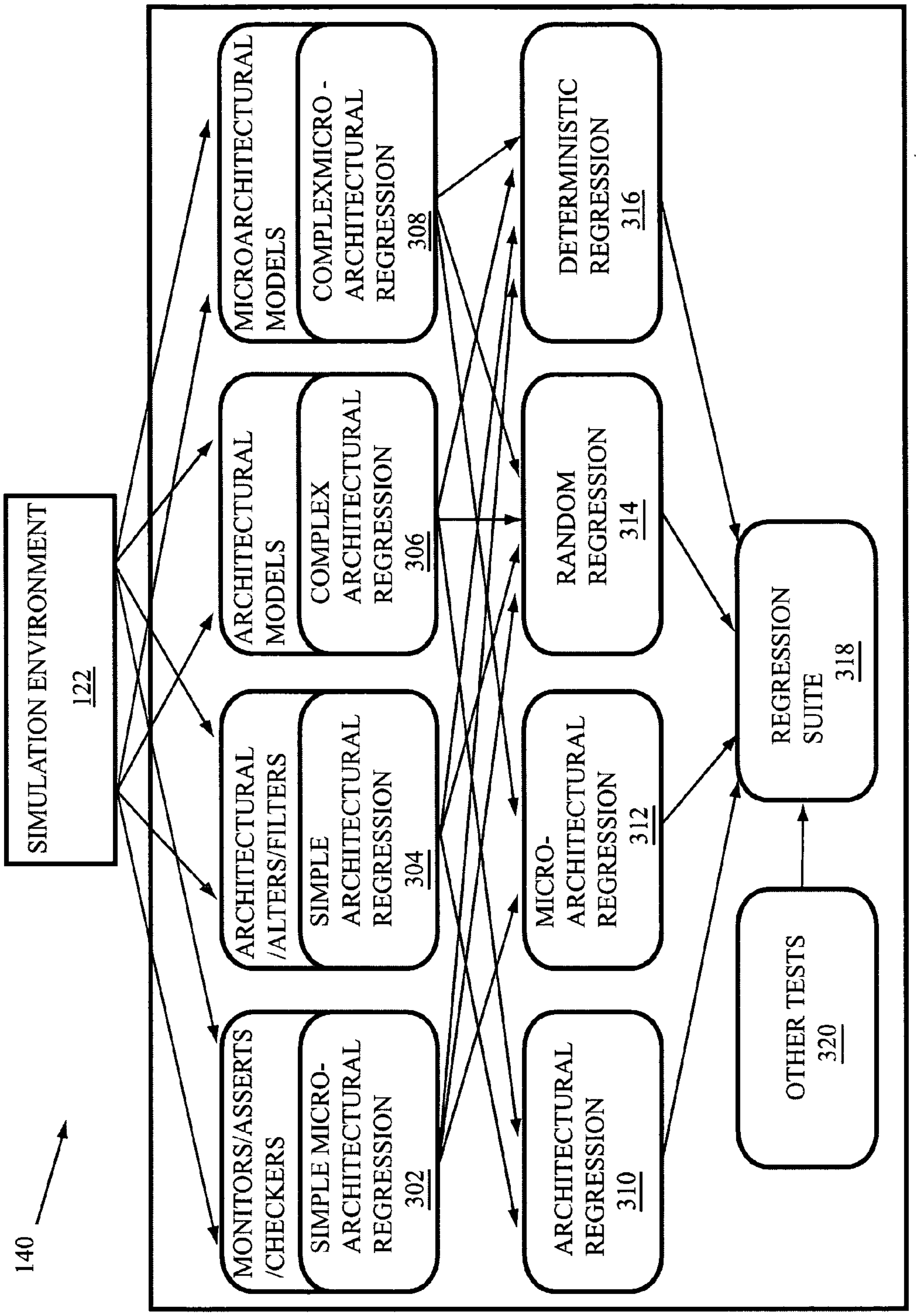
FIG. 3 depicts one embodiment of the regression generator of FIG. 1 with multiple regression strategies.

FIG. 3 depicts one embodiment of the regression generator of FIG. 1 with multiple regression and test generation strategies. Regression generator 140 receives test data from a simulation and test generation environment 122. The test data optionally may be routed through an extractor module 118 and/or a harvester module 114. The tightly-coupled regression, harvesting and job operation and management of system 100 with regression generator 140, in conjunction with the extensible harvesting language and user programmable regression environment, may support a diverse combination of regression and harvesting strategies.

Regression generator 140 may include a plurality of regressions, each with its own regression strategy, based on any design and verification characteristics. For example, one team may want to maintain separate regression for each unit or sub-unit and even apply different algorithms to each regression. In another example, it might be necessary to collect and maintain separate regressions based on the type of tests or the source of tests. This might be necessary if the simulation and test generation environment is different for each test type. Yet in another case, a regression might be necessary for each design level, in order to ensure the design integrity before promoting the design to the next level or shipping it to the next team.

In the depicted embodiment, regression generator 140 includes first-level regressions, including a simple microarchitectural regression 302, a simple architectural regression 304, a complex (and cross-product) architectural regression 306, and a complex and temporal multi-cycle microarchitectural regression 308, each of which applies a regression strategy to incoming test data. Different test generation and coverage analysis tools may be utilized for simple and more complex regression. Regression generator 140 also includes an aggregate architectural coverage regression 310, which may combine and optimize the results of the simple architectural regression 304 and the complex architectural regression 306. Regression may be optimized by applying different regression strategies at different stages of the process. Similarly, microarchitectural coverage regression 312 may combine and further optimize results of the simple microarchitectural regression 302 and the complex microarchitectural regression 308.

Random regression 314 may receive input from all four first-level regressions. Any randomly generated test from any first-level regression may be collected and further optimized in random regression 314. Similarly, deterministic regression 316 may be a collection of all deterministic and manually generated tests from the first-level regressions.

The output from the architectural coverage regression 310, the microarchitectural coverage regression 312, the random regression 314, the deterministic regression 316, or any other tests (received from Other Tests 320) may be combined and optimized in a Final Regression 318. All of the regressions of regression generator 140 may be performed serially, in parallel, simultaneously, etc. One skilled in the art will recognize that any number of regressions, any structure, any number of levels, any types of regression strategies, etc., are possible. Engineers may use any of the above regressions during the functional verification process.

Figure 4:
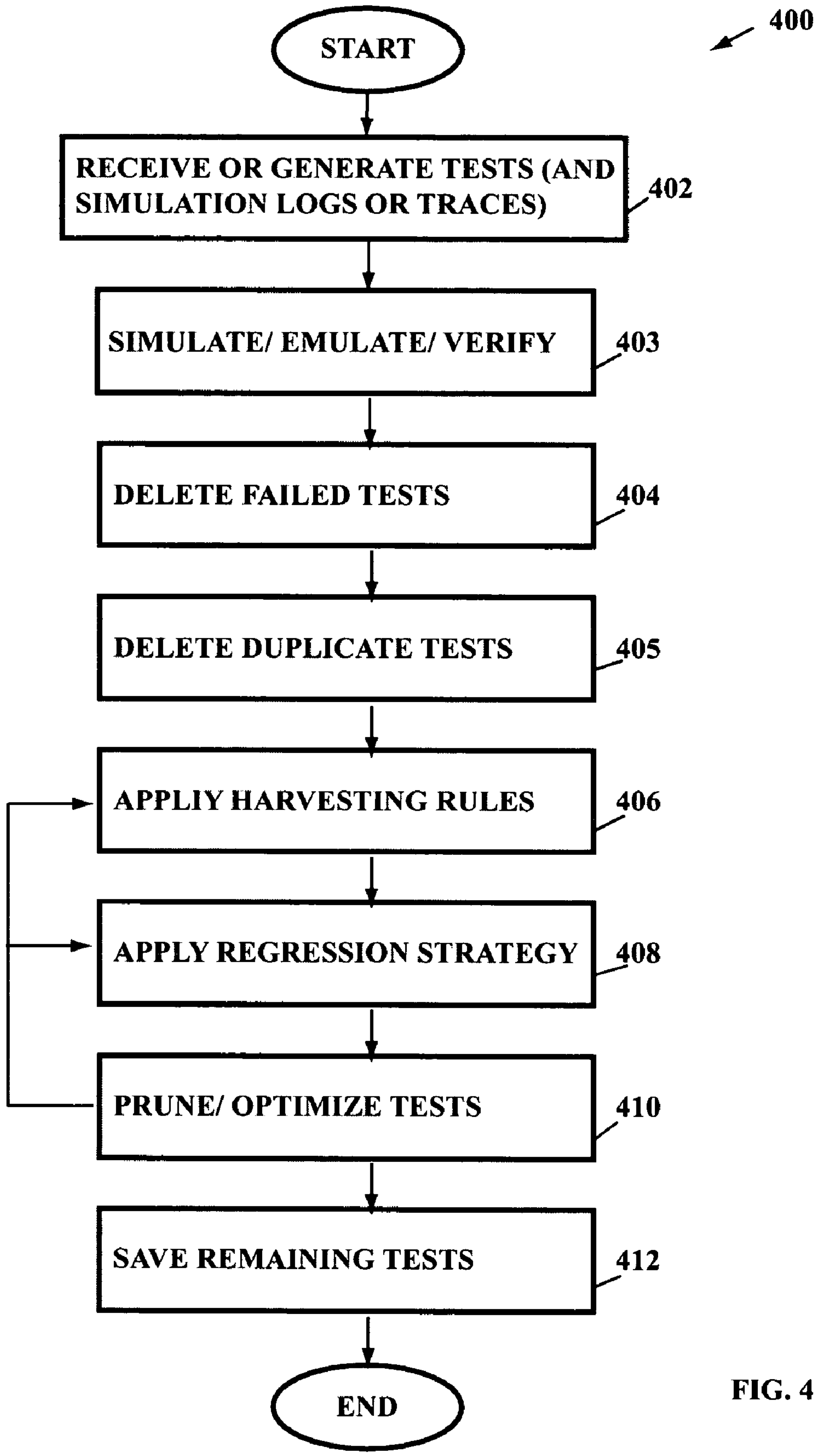
FIG. 4 depicts an example of a flow chart for a method for applying a regression strategy to a plurality of tests.

FIG. 4 depicts an example of a flow chart for a method for applying a regression strategy to a plurality of tests. The method of flow chart 400 may be performed by the regression generator 140 in one embodiment. In alternative embodiments, method 400 may be performed instead by the analysis and management environment 106 or the harvester module 114. In another alternative embodiment, method 400 may be performed by some combination of the regression generator 140, the analysis and management environment 106, and/or the harvester module 114.

The method begins with step 402 by receiving tests or generating tests in or from the simulation and test generation environment 122. The tests may be received from any component of the functional verification regression management system 100, such as the extractor 118. The tests may be received directly from the simulation and test generation environment 122 in one alternative embodiment.

In one embodiment, tests may be received directly from simulation and test generation environment 122 soon after they are completed so that a large backlog of tests is not generated. In another embodiment, tests may be archived in the simulation and test generation environment 122 and forwarded to system 100 in a group or made available as a database of tests in simulation and test generation environment 122. Simulation logs or simulation traces may also be received from the simulation and test generation environment 122 in step 402. Tests received or generated in step 402 may then be simulated in the simulation and test generation environment 122 as part of step 403.

The method continues with step 404, deleting failed tests. If any failed tests are in the group of tests received in step 402, they should be deleted, as they do not add value to the regression suite database 120 as they may not verify any design attribute, conditions, etc. In one embodiment, only passed tests are received, making step 404 unnecessary. In this case, simulation and test generation environment 122 performs pruning and only sends tests that pass simulation.

Method 400 continues in optional step 405, deleting tests that are identical to an existing test (i.e., duplicate tests) in regression system database 120. In this embodiment, the regression suite database 120 may be reviewed to ascertain whether a test being considered is already in the regression suite database 120. If the test is in the regression suite database 120 already, it may safely be eliminated. If it is not in the regression suite database 120, the test should remain for later processing. Step 405, while optional, may provide significant additional reduction in processing time and data set size by accessing the regression suite database 120 instead of just the set of tests on which regression testing is presently being performed. Step 405 may be performed at any point during method 400.

The method continues with step 406, applying harvesting models. Harvesting is the process of identifying, gathering and collecting tests based on criteria defined by a user. Harvesting models allow for early processing and pruning of tests, such as by eliminating redundant tests within the set of tests or eliminating tests relevant to old design features. In the depicted embodiment, the harvesting models are applied before any regression strategies, allowing the harvesting models to act as a "global" filter to all regression strategies. This reduces the number of tests for later processing by selected regression algorithms, saving processing time and resources. Harvesting models may be based on user input received via the regression manager 102. For example, harvesting may be turned on or off for a project by the user.

In one embodiment, a harvesting modeling language may be used for describing the attributes of harvest and specific conditions and features to be considered for harvesting tests. Any type of harvesting test may be used. One example of a harvesting criteria is eliminating tests of a certain type (e.g., eliminating random tests of TST type), tests from certain generators, tests from a particular time period, tests not sufficiently rich (not having enough coverage hits), etc. A standardized naming convention for test files may be particularly useful in utilizing harvesting, as it makes it easier to apply harvesting models. For example, TST files can be identified with a ".TST" extension so that they may be readily identified. Tests could include a header in addition to a naming convention to specify attributes of a test, such as a date, originator, simulator, type, etc.

Method 400 continues with step 408, applying a regression strategy or algorithm. In this step, the algorithm of the selected regression strategy is applied. For example, the greedy first hit regression algorithm described in more detail in relation to FIG. 5 may be applied to the remaining tests. In step 410, tests may be eliminated from consideration based on the application of the regression strategy, such as described in more detail in relation to FIGS. 6-8. If more regression strategies need be performed, the method may return to either step 406 or step 408 for continued application of regression strategies. When all regression strategies to be performed are completed, the method continues to step 412, saving tests in the regression suite database 120, after which the function terminates.

Figure 5:
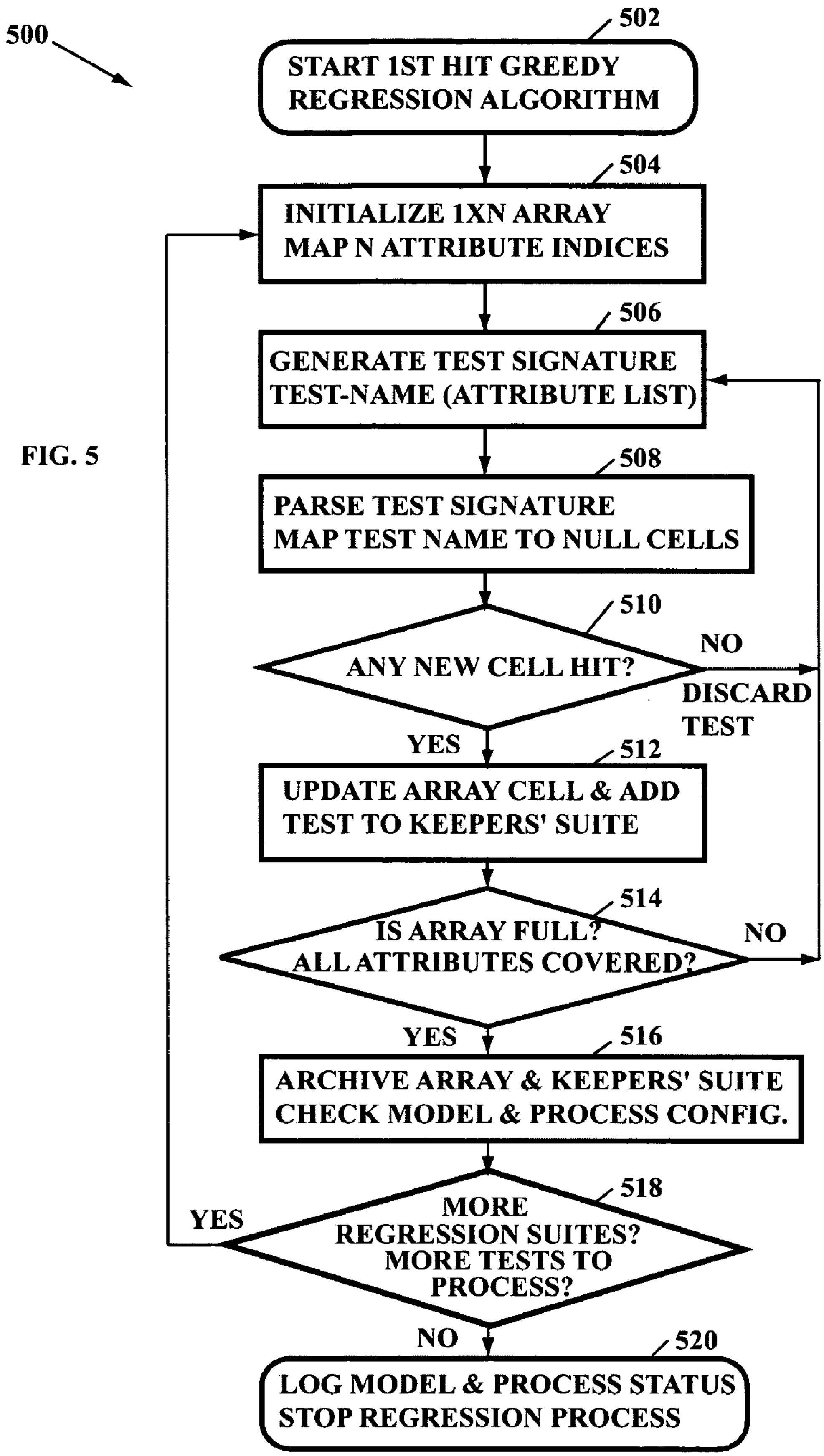
FIG. 5 depicts an example of a flow chart for a method of applying a first hit greedy algorithm regression algorithm.

FIG. 5 depicts an example of a flow chart for a method of applying a first hit greedy regression algorithm. Method 500 may be used, for example, to apply a first hit greedy algorithm regression strategy as described in step 408 of FIG. 4. Method 500 (and the regression strategies described in FIGS. 9 and 13) may be written in any programming language, such as Perl, C, C++, etc., and one skilled in the art will recognize that method 500 includes many details, such as test signatures, array structures, etc., that may be modified in various ways within the scope of the invention. It should also be noted that the algorithms described in FIGS. 5, 9, and 13 may be better described by a different name. The flowcharts and internal processing snapshots provided in relation to FIGS. 5-15 provide a more accurate description of the algorithms than their name.

The regression strategies and algorithms disclosed herein may apply to any regression testing, including any computer software or hardware testing. Although most references and examples used are from the field of processor and integrated circuit design and functional verification, the technique, algorithms, system and methodology are applicable to any field that requires functional and integrity validation during the design and development, as well as during the system's life cycle as upgrades and new functions are added. Verification environments where a large number of random or automatically generated tests are simulated and the quality and progress of the verification is measured based on the actual functional coverage of the verification are particularly suitable. But it also is suitable for any verification environment where the design attributes to be verified (or attributes that are observed when a verification task is successful) can be defined and some form of test program or stimulus is available to drive the model of the design or emulate its function. Accordingly, the coupled regression, harvesting and job operation and management described herein in conjunction with the extensible harvesting language and programmable regression environment may support a diverse combination of regression and harvesting strategies and may be easily extended to any iterative design and verification field.

Method 500 begins in step 502, when the algorithm begins by receiving a request to process a set of tests. In step 504, the method initializes a 1×N array, where N is the number of design attributes being monitored (monitors, checkers, assertions). Next, the method generates a test signature in step 506 in a vector form such as Test_Name (Monitor1, Monitor2, . . . ). The method continues in step 508 where the test signature is parsed and the method marks any array cells that match the index and are empty (null) with the Test Name. This marks attributes as having been satisfied by the test associated with the test signature. In decision block 510, the method determines if the test updates at least one null cell, and if it does, the function continues to block 512 where the array cell is updated and the test is added to a list of keepers. If the test does not update any null cells, the method returns to step 506 to evaluate the next test.

The method continues to decision block 514, where it is determined whether the array block is full (whether all attributes have been covered). If not, the method returns to step 506 for further processing. If yes, the method continues to step 516 where the list of keepers and the array are archived and optionally time stamped. If there are more tests to process, the method returns to step 504 where the array is initialized, etc. If not, the model and process status are logged and the method terminates. In one alternative embodiment, method 500 may be optimized by only searching non-updated cells, which can be accomplished by removing an attribute from the search list when the attribute is updated.

The first hit single pass greedy regression algorithm described above is a fast convergence algorithm because it involves a single pass and simple processing. It also benefits from manageable size, as processing and storage requirements only grow linearly with the number of attributes or the number of tests. When compared to a traditional greedy regression algorithm that keeps all tests that satisfy any attribute, it offers a smaller and denser regression suite database for a relatively low increase in processing resources.

Figure 16:
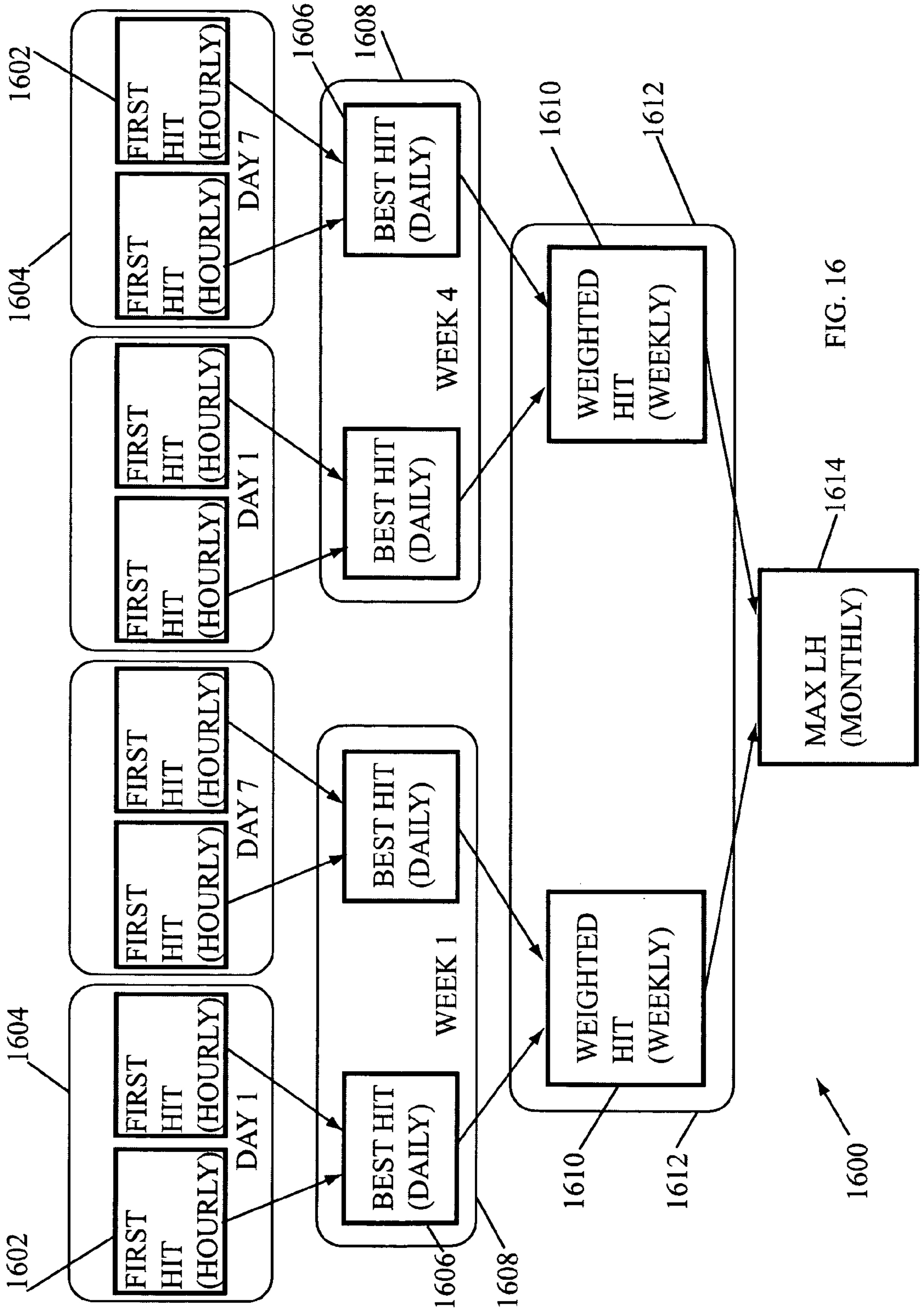
FIG. 16 depicts one embodiment of a regression suite database generation methodology utilizing multiple regression strategies.

FIG. 6 depicts a table showing the internal processing of a first hit single pass greedy regression algorithm such as the one described in FIG. 5. Table 600 includes a test signature column 602, attribute columns 604, and a keepers' list column 606. The test signature column 602 includes a test identification (e.g., test name "T1") and a list of attributes hit (for T1, attributes 1 and 6). The test identification of T1 has been added to the cells for attributes 1 and 6 within the attribute columns 604. This tells the system that Test 1 satisfied attributes 1 and 6. Because Test 1 added a new cell hit, it is added to the keepers' list in the keepers' list column 606. Tests 2 and 3 each also add new attributes, so they are also added to the keepers' list column 606. Test 4, on the other hand, does not add a new attribute (over Tests 1-3) so it is not added to the keepers' list column 606. The algorithm continues until all attributes are satisfied after Test 6, after which the results are saved and the array is reset and the algorithm begins again. The final keepers' list is either processed further or added to the regression suite database 120 for future processing according to the regression strategy, as shown in FIG. 16 in one example.

FIG. 7 depicts a table showing an alternative embodiment of the internal processing of the first hit single pass greedy algorithm of FIG. 6. Table 700 shows an alterative embodiment to table 600 where the test signatures are vectorized. This is accomplished by replacing the test names in the attribute columns 604 with a '1' for a hit and a '0' for no hit. This saves on storage costs at the cost of less information available for later processing. Attribute column 704 only shows if an attribute has been hit but does not include the name of the test that hit that attribute, in contrast to attribute column 604.

FIG. 8 depicts a table showing the internal processing of a sorted first hit single pass greedy regression algorithm in one embodiment. Table 800 shows another alternative embodiment to table 600 where the tests are sorted by the number of coverage hits before processing through the algorithm. By processing the richest tests (the ones that hit the most attributes) first, the regression algorithm can be more effective in reducing the number of tests. This can be seen in table 800, where only three tests were necessary to achieve full coverage (T7, T8, T5) as compared to five (T1, T2, T3, T5, T6) in table 600. This effectiveness comes at the price of more processing and storage requirements. The additional processing comes from the sorting, and the additional storage derives from the fact that, because of the nature of the algorithm, the tests cannot be processed as they come in and therefore must be stored. A vectorized version of this algorithm is similar to the one shown in FIG. 7 may also be utilized.

Figure 9:
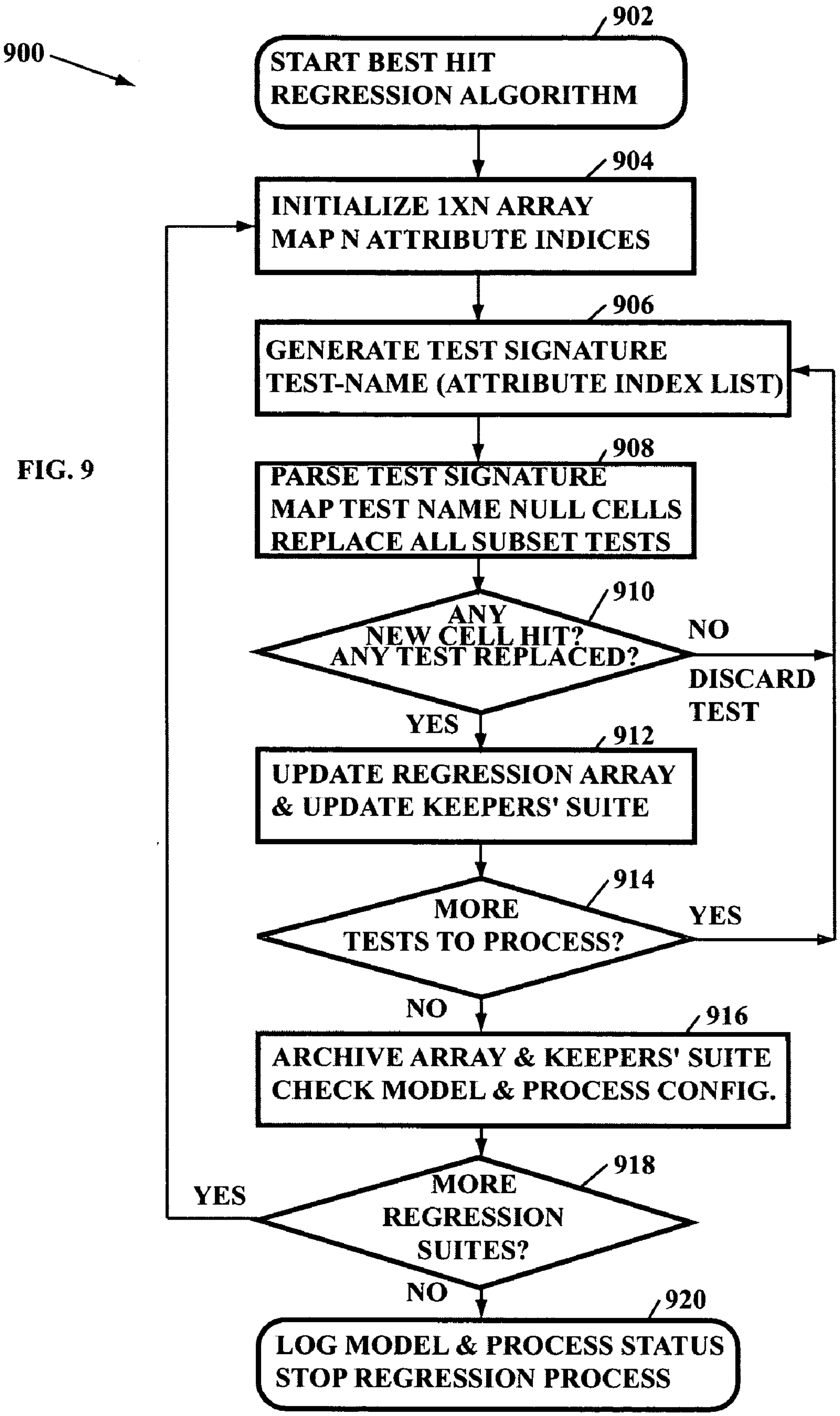
FIG. 9 depicts an example of a flow chart for a method of applying a best hit backward elimination regression algorithm.

FIG. 9 depicts an example of a flow chart for a method of applying a best hit multi-pass backward elimination regression algorithm. Method 900 is an alternative embodiment of method 500 that provides additional rigor by looking backward and possibly undoing decisions that were made previously.

Method 900 begins in step 902, when the algorithm begins by receiving a request to process a set of tests. In step 904, the method initializes a 1×N array, where N is the number of design attributes being monitored (monitors, checkers, assertions). Next, the method generates a test signature in step 906, in a vector form such as Test_Name (Monitor1, Monitor2, . . . ). The method continues in step 908 where the test signature is parsed and the method marks any array cells that match the index and are empty (null) with the Test Name. This marks attributes as having been satisfied by the test associated with the test signature. In step 908, the method also determines if the new test replaces any previous tests that are subsets of the new test. For example, if test 1 hits attribute 1, and test 2 hit attributes 1 and 2, test 1 would be a subset of test 2 and thus extraneous. This requires reviewing all previously marked cells and comparing each new test with all tests in the keepers' suite.

In decision block 910, the method determines if the test updates at least one null cell or if it replaces another test, and if either does, the function continues to block 912 where the array cell(s) is updated and the test is added to a list of keepers (and tests that are subsets are deleted from the keepers' suite). If the test does not update any null cell, the method returns to step 906 to evaluate the next test.

The method continues to decision block 914, where it is determined whether there are more tests to process. If yes, the method returns to step 906 for further processing. If no, the method continues to step 916 where the list of keepers and the array are archived and optionally time stamped. If there are more tests to process, the method returns to step 904 where the array is initialized, etc. If not, the model and process status are logged and the method terminates. In one alternative embodiment, method 900 may be optimized by only searching non-updated cells, which can be accomplished by removing an attribute from the search list when an attribute is updated.

The best hit multi-pass backward elimination regression algorithm is slower than the first hit greedy regression algorithm, as it could require up to M*N*P comparisons, where M is the number of tests, N is the number of attributes and P is the average number of hits per test. The additional processing does result in a denser keepers' list, as tests are removed from the keepers' list when they become subsets of later tests. This method assumes that a test that hits a larger number of attributes is more valuable and will result in a smaller and denser regression suite database 120.

FIG. 10 depicts a table showing the internal processing of a best hit multi-pass backward elimination regression algorithm such as described in relation to FIG. 9. Table 1000 includes a test signature column 1002, attribute columns 1004, and a keepers' list column 1006. The test signature column 1002 includes a test identification (e.g., test name "T1") and a list of attributes hit (for T1, attributes 1 and 6). Test identification of T1 has been added to the cells for attributes 1 and 6 within the attribute columns 1004. This represents that Test 1 satisfied attributes and 6. Because Test 1 added a new cell hit, it is added to the keepers' list in the keepers' list column 1006. Tests 2 and 3 also each add new attributes, so they are also added to the keepers' list column 1006. Since none of Tests 1-3 are subsets of any other test, none are replaced. Test 4, on the other hand, does not add a new attribute (over Tests 1-3) and none of Tests 1-3 are its full sub-set, so Test 4 is not added to the keepers' list column 1006 (and no test is replaced). The algorithm continues after Test 6 even though all attributes are satisfied. Test 7 adds nothing new (as all attributes have been satisfied), but because Tests 1 and 6 are its subsets, those tests are replaced by Test 7 in the keeper's list. Similarly, Test 8 replaces Test 3 in the keeper's list since it has a denser test signature and Test 3 is its subset. After all tests have been processed, the array is reset and the algorithm begins again. The final keeper's list is either processed further or added to the regression suite database 120, for future processing according to the regression strategy.

In a further embodiment to table 1000, a vectorized attribute column may be implemented. This is accomplished by replacing the test names in the attribute columns 1004 with a numeral 1. In contrast to table 700, however, test signatures for keepers must be maintained for the duration of the session, which eliminates some of the storage benefit. This is necessary, so the signature of a new test can be compared to the signature of all tests in the keeper's list.

FIG. 11 depicts a table showing the internal processing of a sorted best hit multi-pass backward elimination regression algorithm in one embodiment. Table 1100 shows a further embodiment to table 1000 where the tests are sorted by coverage density (number of hit attributes) before processing through the algorithm. Table 1100 shows the benefits of combining the methodology of table 1000 with that of table 800 by using a sorted multiple pass backward elimination algorithm. There are additional processing and storage requirements for sorting of all tests for a regression test, but the algorithm converges quicker and results in a smaller regression suite.

FIG. 12 depicts a table showing an alternative representation of the internal processing of the best hit backward elimination regression algorithm in the embodiment of FIG. 11. Table 1200 shows an embodiment where a hit count is maintained for each attribute instead of maintaining a test index. This allows frequently hit attributes to be identified so that system biases or tendencies toward a class of attributes or design segment can be found, allowing for corrections to be made in the harvesting or test generation. Such information is also valuable feedback to automatic and random test generation environments to reduce duplications.

Figure 13:
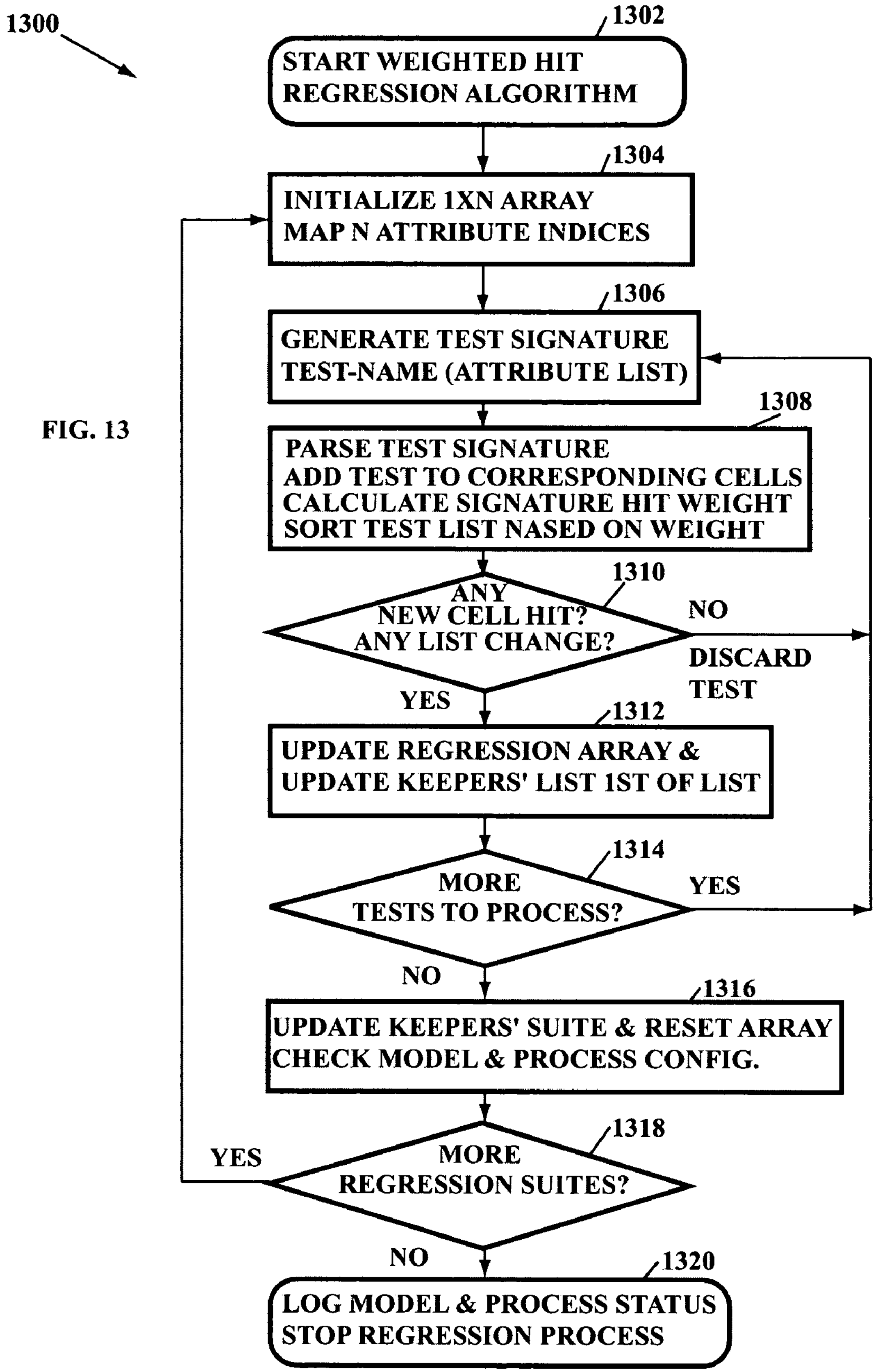
FIG. 13 depicts an example of a flow chart for a method of applying a normalized weighted hit algorithm regression algorithm.

FIG. 13 depicts an example of a flow chart for a method of applying a normalized weighted hit regression algorithm. In this algorithm, if a test's signature is a multiple subset (subset of multiple tests) it is deemed valuable information and the test name is kept as a part of the regression array, but it neither replaces any test nor is it included on the keepers' list. This algorithm does not require sorting and storing of all tests and is thus suited to being applied as tests come in, but it does require storing the full signature for each cell. It also requires processing and sorting of all updated cells after each test and produces a result as optimized as the sorted best fit algorithm.

Method 1300 begins in step 1302, when the algorithm begins by receiving a request to process a set of tests. In step 1304, the method initializes a 1×N array, where N is the number of design attributes being monitored (monitors, checkers, assertions). Next, the method generates a test signature in step 1306, in a vector form such as Test_Name (Monitor1, Monitor2, . . . ). The method continues in step 1308 where the test signature is parsed and the method maps the test to corresponding cells. In step 1308, the method also calculates the test coverage density (i.e., the number of attributes hit by its signature) and sorts the test list of a cell based on that weight. Tests with the same signature length are sorted based on the least frequently hit attributes, while tests with first time hit attributes are deemed more valuable (as they include more rare hits). In this algorithm, the test weight is generated based on the number and quality of attributes in its signature and this weight becomes the criteria for sorting tests in each cell. Tests with equal signature length are assigned a weight proportional to the number of first time hits their signature contributed to and then based on the number of low hit attributes they include.

In decision block 1310, the method determines if the test updates at least one null cell or if there was a test list change, and if either happened, the function continues to block 1312 where the regression array and keepers' list are updated. If neither is true, the method returns to step 1306 to evaluate the next test. In block 1312, the test with the highest normalized weight from each cell is added to the keeper's list.

The method continues to decision block 1314, where it is determined whether there are more tests to process and, if so, the method returns to step 1306 for further processing. If not, the method continues to step 1316 where the list of keepers is updated and the array is reset. The method continues to decision step 1318, where model and process configurations are examined to determine if there are more regression suite databases. If so, the method returns to step 1304 and if not, the function continues to step 1320 where the model and process status are logged and the regression process stopped.

FIG. 14 depicts a table showing the internal processing of a normalized weighted hit regression algorithm in one embodiment. Table 1400 includes a test signature column 1402, attribute columns 1404, and a keepers' list column 1406. The test signature column 1402 includes a test identification (e.g., "T1") and a list of attributes hit (for T1, attributes 1 and 6). Test identification of T1 has been added to the array for attributes 1 and 6 within the attribute columns 1404. This tells the system that Test 1 satisfied attributes 1 and 6. After each test is processed, all hit cells are sorted and the first test in each cell is added to the keeper's list. Because Test 1 added a new cell hit, it is added to the keepers' list in the keepers' list column 1406. Tests 2 and 3 also each add new attributes, so they are also added to the keepers' list column 1406. The list of Tests 1, 2, and 3 is sorted based on signature hit weight. Test 4, on the other hand, does not add a new attribute (over Tests 1-3), but is the first in the sorted list for cell 1, 3, and 5 and therefore added to the keepers' list column 1406. After each test is processed, the algorithm starts with the first cell, sorts all tests in that cell (if changed since the last test), and picks the first test in the list as a candidate for the keeper's list. The algorithm continues through Test 7, ultimately resulting in a list of Tests 7, 5, and 8. The final keepers' list is either processed further or added to the regression suite database 120. This algorithm produces good results (e.g., 3 tests) and may be applied on a real-time basis. The algorithm may require additional storage, since all tests for each attribute are stored. In addition, after each test, all tests for all attributes are sorted a new keeper's list generated. It may also require additional processing since lists of tests for all attributes are evaluated and sorted after each new test is processed to generate an updated keeper's list.

FIG. 15 depicts a table showing the internal processing of a sorted normalized weighted hit regression algorithm in another embodiment. Table 1500 shows a further embodiment to table 1400 where the tests are sorted by the number of coverage hits before processing through the algorithm, which may reduce the number of processing steps. In the depicted embodiments, table 1500 ends up with the same result as table 1400 but in only six steps instead of eight steps. A vectorized version of this algorithm may also be utilized. Since all tests have to be collected and sorted, storage requirements are higher and cannot be applied on a real-time basis.

Other algorithms are anticipated and within the scope of the invention. One possible alternative algorithm is the maximum likelihood algorithm. In this algorithm, it is assumed that the likelihood that frequently hit attributes continue to be the popular ones is proportional to the density of the attribute in the current regression. In other words, those attributes that are getting a large percentage of hits will probably continue to do so, and therefore tests producing these attributes are good candidates to be filtered out. This algorithm identifies the frequently hit attributes, forms harvesting models to reduce the flow of tests generating the frequently hit attributes in the regression process. These harvesting models may be propagated to the extractor module 118 and analysis environment 106 in order to reduce generation of tests with similar signatures and thus reducing simulation and post-processing of these tests, thus freeing up simulation and harvesting resources for tests producing infrequent hit attributes.

Another alternative algorithm is the normalized weighted sum algorithm. This algorithm takes into consideration the rarity of attributes hit by a test. Instead of simply considering the number of attributes hit by a test (as in the Normalized Weighted Hit algorithm), this puts more emphasis on rare attributes. A test that has hit a few rare attributes is probably more valuable to the regression than a test that has hit many frequently hit attributes. In this algorithm, an array of total hit counts is maintained for each attribute. All attribute counts are normalized (Max hit count/attribute hit count). This results in low hit monitors having a higher weight.

FIG. 16 depicts one embodiment of a project regression methodology utilizing multiple regression strategies. System 1600 illustrates how a project may mix and match multiple regression strategies based on different algorithms to build hierarchical hourly, daily, weekly and monthly regression suites. The overall goal of a regression methodology such as the one shown in FIG. 16 is collecting a suite of tests or validation programs utilized for verifying a design (hardware or software) and continuously evaluating and optimizing the regression suite database such that the overall effective verification signature of the regression increases and the number of tests (or simulation resources required to exercise the regression suite database) is minimized, thus increasing the regression density (effectiveness) and the time required to re-verify the design. Users can customize the regression strategies by selecting the algorithms, specifying maximum size of the regression suite database, density threshold, as well as the regression optimization attributes.

System 1600 includes four layers of regression strategies in the depicted embodiment. Regression 1602 may include a first hit regression being performed hourly. In other words, after one hour's worth of tests are collected, a first hit regression may be performed to generate an optimized hourly regression suite. A first hit regression is particularly suitable for the hourly regression, as there are large volumes of test data coming that need to be handled quickly, and even temporary storage of that data can quickly become a daunting task. Regression 1604 depicts combining all hourly regressions at the end of day and generating an optimized first hit daily regression 1606.

At the end of each week all seven daily suites 1606 for that week are combined into one suite 1608 and duplicate tests are removed. A weighted hit algorithm may then be applied to suite 1608 to generate an optimized weekly regression suite 1610. At the end of each month, all weekly suites 1610 for that month may be combined and another regression algorithm (such as a maximum likelihood algorithm) may be applied to the weekly suites 1612 to generate an optimized monthly regression suite 1614. As one moves down the regression methodology hierarchy (as depicted in FIG. 16), there is more time to apply more sophisticated and complex algorithms.

Each row of FIG. 16 represents a different strategy. Fast algorithms may be used at the top tiers (1602, 1604) where there are a large number of tests and real-time processing may be required. Algorithms that can process and optimize a near optimized regression require more processing and therefore are desirably performed in batch mode (background) and are applied to weekly or monthly regression suites for additional optimizations. Any combination of regression algorithms and strategies may be utilized, such as different algorithms for any particular aspect or utilization of different timeframes (i.e., 10 minute regression suites instead of hourly).

System 1600 allows for a very high number of tests that are be continually generated to be consolidated into one efficient and optimized regression suite database 120 at the end of a month of testing. Different regression strategies, different timeframes, different structures, etc. may also be used.

While the foregoing is directed to embodiments of the present invention, other and further embodiments of the invention may be devised without departing from the basic scope thereof, and the scope thereof is determined by the claims that follow.

What is claimed is:

1. A method of performing regression, the method comprising:

receiving a test signature, the test signature including an indication of design attributes verified by the test;

initializing an array;

after parsing the test signature, mapping an indication of the test name to null cells in the array associated with the attributes satisfied by the test;

determining whether a new attribute was hit by the test;

adding test to keepers' list if a new attribute was hit by the test;

receiving a plurality of test signatures;

determining a signature hit weight for each of the plurality of test signatures;

sorting the test signatures based on the determined signature hit weights; and selectively eliminating one or more tests based at least partially on the determined signature hit weights.

2. The method of claim 1, wherein the indication of the test name is vectorized.

3. The method of claim 1, further comprising:

after receiving the plurality of test signatures, sorting the plurality of test signatures based on coverage density.

4. The method of claim 1, further comprising:

after receiving the plurality of test signatures, determining if a new test replaces one or more previous tests; and selectively eliminating the one or more previous test from the keepers' list.

5. The method of claim 4, wherein determining if the new test replaces one or more previous tests comprises determining that the new test replaces a particular previous test in response to determining that all test signatures of the particular previous test are included in the new test.

* * * * *